(12) United States Patent
Sodagar (10) Patent No.: US 8,379,985 B2
(45) Date of Patent: Feb. 19, 2013

(54) DOMINANT GRADIENT METHOD FOR FINDING FOCUSED OBJECTS

(75) Inventor: Iraj Sodagar, La Jolla, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 633 days.

(21) Appl. No.: 12/497,589

(22) Filed: Jul. 3, 2009

(65) Prior Publication Data

US 2011/0002555 A1    Jan. 6, 2011

(51) Int. Cl.
*G06K 9/46* (2006.01)
*G06K 9/40* (2006.01)

(52) U.S. Cl. .................... 382/195; 382/255

(58) Field of Classification Search ............ 382/195
See application file for complete search history.

(56) References Cited

U.S. PATENT DOCUMENTS

| | | | |
|---|---|---|---|
| 5,684,714 A | 11/1997 | Yogeshwar et al. | |
| 5,748,789 A | 5/1998 | Lee et al. | |
| 5,815,601 A | 9/1998 | Katata et al. | |
| 5,889,881 A * | 3/1999 | MacAulay et al. | 382/133 |
| 6,005,980 A | 12/1999 | Eifrig et al. | |
| 6,810,086 B1 | 10/2004 | Puri et al. | |
| 7,305,127 B2 * | 12/2007 | Wells | 382/168 |
| 2001/0004739 A1 | 6/2001 | Sekiguchi et al. | |
| 2002/0026616 A1 | 2/2002 | Kikuchi et al. | |
| 2002/0164060 A1 * | 11/2002 | Paik et al. | 382/128 |
| 2005/0141765 A1 * | 6/2005 | Liang et al. | 382/181 |
| 2005/0185838 A1 * | 8/2005 | Bogoni et al. | 382/165 |
| 2005/0271278 A1 * | 12/2005 | Liang et al. | 382/195 |
| 2006/0018549 A1 * | 1/2006 | Liang et al. | 382/190 |
| 2007/0071433 A1 * | 3/2007 | Kawanami | 396/127 |
| 2009/0019386 A1 | 1/2009 | Sweetland et al. | |

OTHER PUBLICATIONS

Yao et al., Fast Image Segmentation by Sliding in the Derivative Terrain, SPIE vol. 1607, 1991, pp. 369-379.*
Fairfield, Toboggan contrast enhancement for contrast segmentation, Pattern Recognition, 1990, 10th Intentional Conference of Proceedings, vol. I, pp. 712-716.*

* cited by examiner

*Primary Examiner* — David Zarka
(74) *Attorney, Agent, or Firm* — Haverstock & Owens LLP (57) ABSTRACT

The dominant gradient method for finding focused objects determines focused objects within an image or video frame using a dominant gradient method. The method also uses a segmentation map of the image to determine parameters which are used in ranking the objects based on their focus. The ranking of the objects is able to be used to assist in enhancing the image, encoding the image and adjusting the lens while capturing the image.

36 Claims, 4 Drawing Sheets

DOMINANT GRADIENT METHOD FOR FINDING FOCUSED OBJECTS

FIELD OF THE INVENTION

The present invention relates to the field of image/video focusing and encoding. More specifically, the present invention relates to enhancing the focusing and encoding of images/video by determining focused areas of the images/video.

BACKGROUND OF THE INVENTION

A video sequence consists of a number of pictures, usually called frames. Subsequent frames are very similar, thus containing a lot of redundancy from one frame to the next. Before being efficiently transmitted over a channel or stored in memory, video data is compressed to conserve both bandwidth and memory. The goal is to remove the redundancy to gain better compression ratios. A first video compression approach is to subtract a reference frame from a given frame to generate a relative difference. A compressed frame contains less information than the reference frame. The relative difference can be encoded at a lower bit-rate with the same quality. The decoder reconstructs the original frame by adding the relative difference to the reference frame.

A more sophisticated approach is to approximate the motion of the whole scene and the objects of a video sequence. The motion is described by parameters that are encoded in the bit-stream. Pixels of the predicted frame are approximated by appropriately translated pixels of the reference frame. This approach provides an improved predictive ability than a simple subtraction. However, the bit-rate occupied by the parameters of the motion model must not become too large.

In general, video compression is performed according to many standards, including one or more standards for audio and video compression from the Moving Picture Experts Group (MPEG), such as MPEG-1, MPEG-2, and MPEG-4. Additional enhancements have been made as part of the MPEG-4 part 10 standard, also referred to as H.264, or AVC (Advanced Video Coding). Under the MPEG standards, video data is first encoded (e.g. compressed) and then stored in an encoder buffer on an encoder side of a video system. Later, the encoded data is transmitted to a decoder side of the video system, where it is stored in a decoder buffer, before being decoded so that the corresponding pictures can be viewed.

The intent of the H.264/AVC project was to develop a standard capable of providing good video quality at bit rates that are substantially lower than what previous standards would need (e.g. MPEG-2, H.263, or MPEG-4 Part 2). Furthermore, it was desired to make these improvements without such a large increase in complexity that the design is impractical to implement. An additional goal was to make these changes in a flexible way that would allow the standard to be applied to a wide variety of applications such that it could be used for both low and high bit rates and low and high resolution video. Another objective was that it would work well on a very wide variety of networks and systems.

H.264/AVC/MPEG-4 Part 10 contains many new features that allow it to compress video much more effectively than older standards and to provide more flexibility for application to a wide variety of network environments. Some key features include multi-picture motion compensation using previously-encoded pictures as references, variable block-size motion compensation (VBSMC) with block sizes as large as 16×16 and as small as 4×4, six-tap filtering for derivation of half-pel luma sample predictions, macroblock pair structure, quarter-pixel precision for motion compensation, weighted prediction, an in-loop deblocking filter, an exact-match integer 4×4 spatial block transform, a secondary Hadamard transform performed on "DC" coefficients of the primary spatial transform wherein the Hadamard transform is similar to a fast Fourier transform, spatial prediction from the edges of neighboring blocks for "intra" coding, context-adaptive binary arithmetic coding (CABAC), context-adaptive variable-length coding (CAVLC), a simple and highly-structured variable length coding (VLC) technique for many of the syntax elements not coded by CABAC or CAVLC, referred to as Exponential-Golomb coding, a network abstraction layer (NAL) definition, switching slices, flexible macroblock ordering, redundant slices (RS), supplemental enhancement information (SEI) and video usability information (VUI), auxiliary pictures, frame numbering and picture order count. These techniques, and several others, allow H.264 to perform significantly better than prior standards, and under more circumstances and in more environments. H.264 usually performs better than MPEG-2 video by obtaining the same quality at half of the bit rate or even less.

MPEG is used for the generic coding of moving pictures and associated audio and creates a compressed video bit-stream made up of a series of three types of encoded data frames. The three types of data frames are an intra frame (called an I-frame or I-picture), a bi-directional predicated frame (called a B-frame or B-picture), and a forward predicted frame (called a P-frame or P-picture). These three types of frames can be arranged in a specified order called the GOP (Group Of Pictures) structure. I-frames contain all the information needed to reconstruct a picture. The I-frame is encoded as a normal image without motion compensation. On the other hand, P-frames use information from previous frames and B-frames use information from previous frames, a subsequent frame, or both to reconstruct a picture. Specifically, P-frames are predicted from a preceding I-frame or the immediately preceding P-frame.

Frames can also be predicted from the immediate subsequent frame. In order for the subsequent frame to be utilized in this way, the subsequent frame must be encoded before the predicted frame. Thus, the encoding order does not necessarily match the real frame order. Such frames are usually predicted from two directions, for example from the I- or P-frames that immediately precede or the P-frame that immediately follows the predicted frame. These bidirectionally predicted frames are called B-frames.

There are many possible GOP structures. A common GOP structure is 15 frames long, and has the sequence I_BB_P_BB_P_BB_P_BB_P_BB_. A similar 12-frame sequence is also common. I-frames encode for spatial redundancy, P and B-frames for both temporal redundancy and spatial redundancy. Because adjacent frames in a video stream are often well-correlated, P-frames and B-frames are only a small percentage of the size of I-frames. However, there is a trade-off between the size to which a frame can be compressed versus the processing time and resources required to encode such a compressed frame. The ratio of I, P and B-frames in the GOP structure is determined by the nature of the video stream and the bandwidth constraints on the output stream, although encoding time may also be an issue. This is particularly true in live transmission and in real-time environments with limited computing resources, as a stream containing many B-frames can take much longer to encode than an I-frame-only file.

B-frames and P-frames require fewer bits to store picture data, generally containing difference bits for the difference between the current frame and a previous frame, subsequent frame, or both. B-frames and P-frames are thus used to reduce redundancy information contained across frames. In operation, a decoder receives an encoded B-frame or encoded P-frame and uses a previous or subsequent frame to reconstruct the original frame. This process is much easier and produces smoother scene transitions when sequential frames are substantially similar, since the difference in the frames is small.

Each video image is separated into one luminance (Y) and two chrominance channels (also called color difference signals Cb and Cr). Blocks of the luminance and chrominance arrays are organized into "macroblocks," which are the basic unit of coding within a frame.

In the case of I-frames, the actual image data is passed through an encoding process. However, P-frames and B-frames are first subjected to a process of "motion compensation." Motion compensation is a way of describing the difference between consecutive frames in terms of where each macroblock of the former frame has moved. Such a technique is often employed to reduce temporal redundancy of a video sequence for video compression. Each macroblock in the P-frames or B-frame is associated with an area in the previous or next image that it is well-correlated, as selected by the encoder using a "motion vector." The motion vector that maps the macroblock to its correlated area is encoded, and then the difference between the two areas is passed through the encoding process.

Conventional video codecs use motion compensated prediction to efficiently encode a raw input video stream. The macroblock in the current frame is predicted from a displaced macroblock in the previous frame. The difference between the original macroblock and its prediction is compressed and transmitted along with the displacement (motion) vectors. This technique is referred to as inter-coding, which is the approach used in the MPEG standards.

One of the most time-consuming components within the encoding process is motion estimation. Motion estimation is utilized to reduce the bit rate of video signals by implementing motion compensated prediction in combination with transform coding of the prediction error. Motion estimation-related aliasing is not able to be avoided by using inter-pixel motion estimation, and the aliasing deteriorates the prediction efficiency. In order to solve the deterioration problem, half-pixel interpolation and quarter-pixel interpolation are adapted for reducing the impact of aliasing. To estimate a motion vector with quarter-pixel accuracy, a three step search is generally used. In the first step, motion estimation is applied within a specified search range to each integer pixel to find the best match. Then, in the second step, eight half-pixel points around the selected integer-pixel motion vector are examined to find the best half-pixel matching point. Finally, in the third step, eight quarter-pixel points around the selected half-pixel motion vector are examined, and the best matching point is selected as the final motion vector. Considering the complexity of the motion estimation, the integer-pixel motion estimation takes a major portion of motion estimation if a full-search is used for integer-pixel motion estimation. However, if a fast integer motion estimation algorithm is utilized, an integer-pixel motion vector is able to be found by examining less than ten search points. As a consequence, the computation complexity of searching the half-pixel motion vector and quarter-pixel motion vector becomes dominant.

Further, determining the focused components of an image or video has been used in image recognition such as to help distinguish objects such as faces and even characterize the importance of the objects within the image.

SUMMARY OF THE INVENTION

The dominant gradient method for finding focused objects determines focused objects within an image or video frame using a dominant gradient method. The method also uses a segmentation map of the image to determine parameters which are used in ranking the objects based on their focus. The ranking of the objects is able to be used to assist in enhancing the image, encoding the image and adjusting the lens while capturing the image.

In one aspect, a method of determining a focused object utilizing a computing device comprises calculating a dominant gradient map, calculating a boundary for each object within a segmentation map, thickening the boundary for each object, calculating one or more parameters for each object and ranking the objects based on the one or more parameters. The focused object is contained in one of an image and a video frame. Calculating a dominant gradient map further comprises computing a gradient at each pixel, defining a window around each pixel, calculating a slope of the gradient at each pixel and selecting a dominant gradient factor based on the slope of the gradient at each pixel. The method further comprises refining the segmentation map. Refining includes at least one of marking disconnected regions of same objects as separate objects, merging objects with areas smaller than a specified number of pixels with a closest object and generating a secondary binary dominant gradient map using the dominant gradient map and morphological dilation. The method further comprises reordering the segmentation map. An object at the top of the rankings is the most focused object. The one or more parameters includes a least one of a perimeter of each object, an average focus factor and a uniformity focus factor. The objects with a high average focus factor and a high uniformity focus factor are focused objects. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a method of determining a focused object utilizing a computing device comprises calculating a dominant gradient map, refining a segmentation map, reordering the segmentation map, calculating a boundary for each object within the segmentation map, thickening the boundary for each object, calculating one or more parameters for each object and ranking the objects based on the one or more parameters. The focused object is contained in one of an image and a video frame. Calculating a dominant gradient map further comprises computing a gradient at each pixel, defining a window around each pixel, calculating a slope of the gradient at each pixel and selecting a dominant gradient factor based on the slope of the gradient at each pixel. Refining includes at least one of marking disconnected regions of same objects as separate objects, merging objects with areas smaller than a specified number of pixels with a closest object and generating a secondary binary dominant gradient map using the dominant gradient map and morphological dilation. An object at the top of the rankings is the most focused object. The one or more parameters includes a least one of a perimeter of each object, an average focus factor and a uniformity focus factor. Objects with a high average focus factor and a high uniformity focus factor are focused objects. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a device for determining a focused object utilizing a computing device comprises a memory for storing an application, the application configured for calculating a dominant gradient map, calculating a boundary for each object within a segmentation map, thickening the boundary for each object, calculating one or more parameters for each object and ranking the objects based on the one or more parameters and a processing component coupled to the memory, the processing component configured for processing the application. The focused object is contained in one of an image and a video frame. Calculating a dominant gradient map further comprises computing a gradient at each pixel, defining a window around each pixel, calculating a slope of the gradient at each pixel and selecting a dominant gradient factor based on the slope of the gradient at each pixel. The application is further configured for refining the segmentation map. Refining includes at least one of marking disconnected regions of same objects as separate objects, merging objects with areas smaller than a specified number of pixels with a closest object and generating a secondary binary dominant gradient map using the dominant gradient map and morphological dilation. The application is further configured for reordering the segmentation map. An object at the top of the rankings is the most focused object. The one or more parameters includes a least one of a perimeter of each object, an average focus factor and a uniformity focus factor. Objects with a high average focus factor and a high uniformity focus factor are focused objects. The device captures one of an image and a video.

In another aspect, an application for determining a focused object implemented by a computing device comprises a dominant gradient component configured for calculating a dominant gradient map, a segmentation map component operatively coupled to the dominant gradient component, the segmentation map component configured for refining a segmentation map and reordering the segmentation map, a boundary component operatively coupled to the segmentation map component, the boundary component configured for calculating a boundary for each object and thickening the boundary for each object, a parameter component operatively coupled to the boundary component, the parameter component configured for calculating one or more parameters and a ranking component operatively coupled to the parameter component, the ranking component for ranking the objects according to the one or more parameters. Refining the segmentation map includes at least one of marking disconnected regions of same objects as separate objects, merging objects with areas smaller than a specified number of pixels with a closest object and generating a secondary binary dominant gradient map using the dominant gradient map and morphological dilation. An object at the top of the rankings is the most focused object. The one or more parameters includes a least one of a perimeter of each object, an average focus factor and a uniformity focus factor. Objects with a high average focus factor and a high uniformity focus factor are focused objects. The computing device is selected from the group consisting of a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television and a home entertainment system.

In another aspect, a network of devices comprises a recording device and a computing device coupled to the recording device, wherein the computing device and the recording device each contain a memory for storing an application, the application configured for calculating a dominant gradient map, calculating a boundary for each object within a segmentation map, thickening the boundary for each object, calculating one or more parameters for each object and ranking the objects based on the one or more parameters and a processing component coupled to the memory, the processing component configured for processing the application. Calculating a dominant gradient map further comprises computing a gradient at each pixel, defining a window around each pixel, calculating a slope of the gradient at each pixel and selecting a dominant gradient factor based on the slope of the gradient at each pixel. The application is further configured for refining the segmentation map. Refining includes at least one of marking disconnected regions of same objects as separate objects, merging objects with areas smaller than a specified number of pixels with a closest object and generating a secondary binary dominant gradient map using the dominant gradient map and morphological dilation. The application is further configured for reordering the segmentation map. An object at the top of the rankings is the most focused object. The one or more parameters includes a least one of a perimeter of each object, an average focus factor and a uniformity focus factor. Objects with a high average focus factor and a high uniformity focus factor are focused objects. The recording device captures one of an image and a video. The computing device displays one of an image and a video.

DETAILED DESCRIPTION OF THE PREFERRED EMBODIMENT

A Dominant Gradient (DG) method works based on the theory that a focused object in a scene of an image or video has a sharp edge (if any) and there is no significant transition around the sharp edge because blur areas tend to have multiple rings/variations around the sharp edge due to being out of focus.

Figure 1:
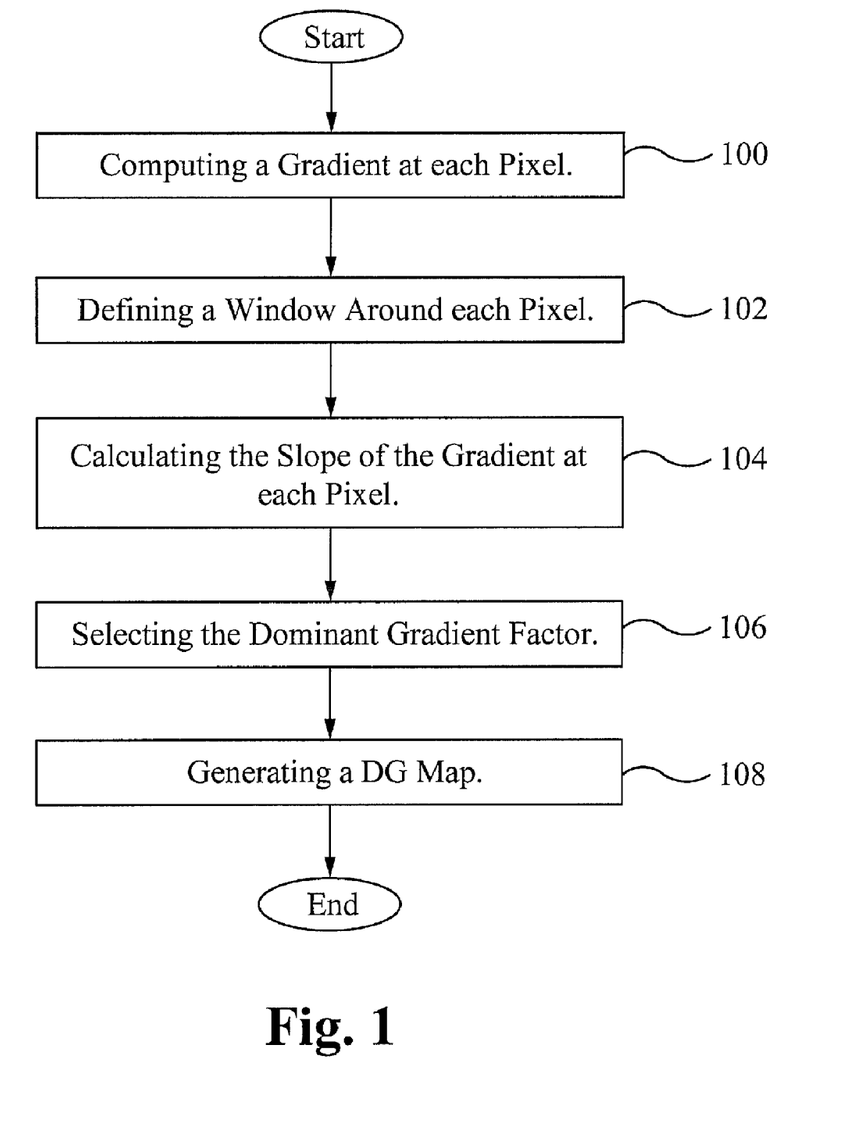
FIG. 1 illustrates a flowchart of implementing the dominant gradient method.

FIG. 1 illustrates a flowchart of implementing the DG method. Based on the above idea, a gradient is computed at each pixel of the input image, in the step 100. The gradient is able to be of L1, L2 or L(N) norm in which N is a real number. Then, in the step 102, a window or neighborhood of size W around each pixel is defined. For each direction in that window, where the number of directions depends on the size of the window, the slope of the gradient at each side of a pixel is calculated, in the step 104. The slope is calculated by determining the difference between the gradient at the center of a window and the most outward pixel at each side of the direction in that window, and then that difference is divided by the distance between the two pixels. The distance is able to be calculated based on L1, L2 or L(N) norm, again N being a real number. The slope for all possible directions is calculated, and then the maximum value of all of the values calculated is chosen as the Dominant Gradient Factor for that specific pixel, in the step 106. In the step 108, a map equal to the size of the image is generated in which each value represents the focus-ness degree of the corresponding pixel in the input image. The highest value is the most focused pixel, and the lowest value is the least focused pixel.

In some embodiments, the pixels are able to be ranked from the most focused to the least focused, and a specified percentage are able to be chosen. The chosen pixels correspond to a certain percentage of edge pixels in and around the depth of field.

The DG method provides a simple consistent method of finding the most focused pixels in an image and ranking them.

Figure 2:
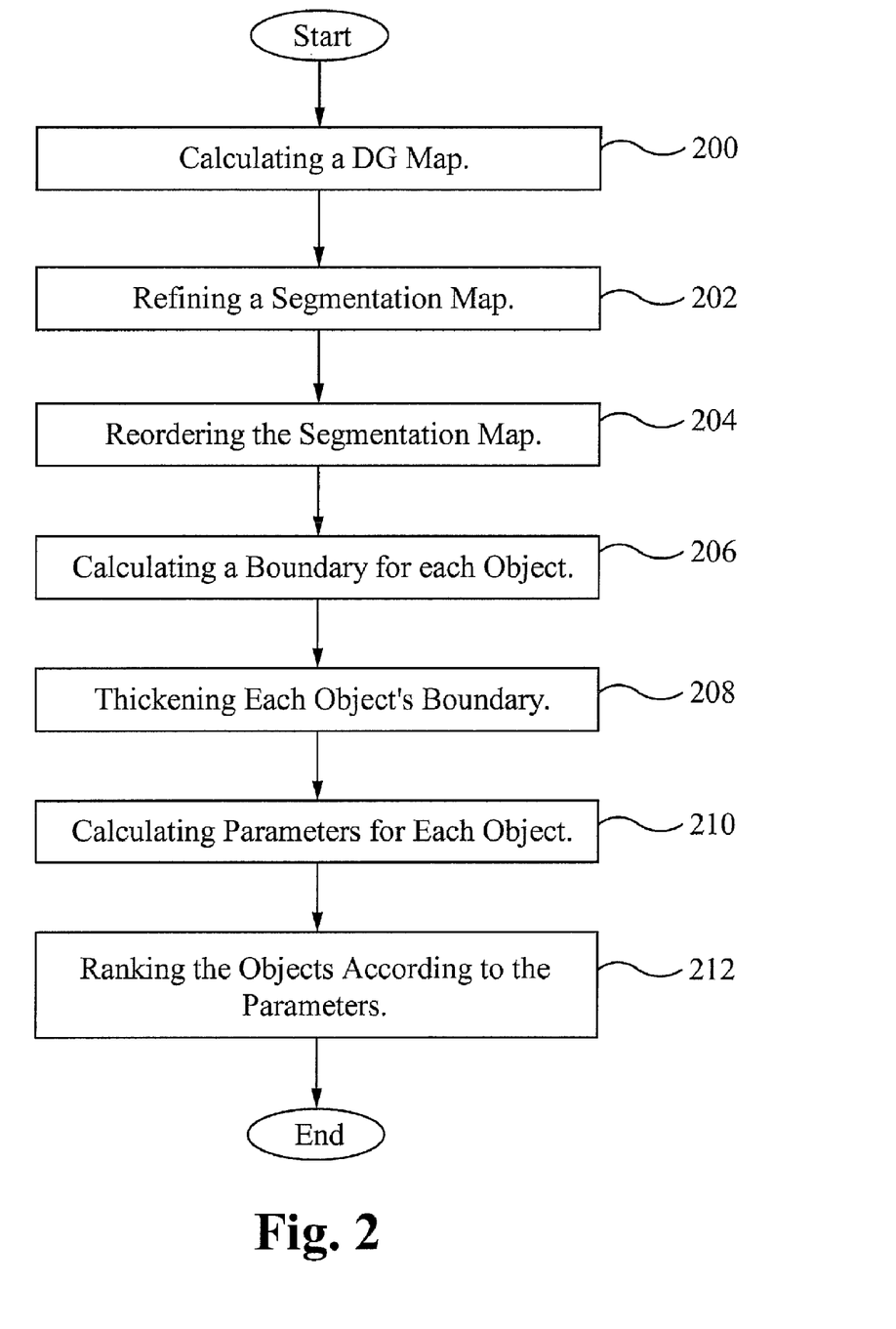
FIG. 2 illustrates a flowchart of a method of utilizing the dominant gradient to find focused objects.

FIG. 2 illustrates a flowchart of a method of utilizing the dominant gradient to find focused objects. For an input image or frame of video, along with its received or computed segmentation map, the following steps are performed. The segmentation map is generated from each segmented object identifying the location and boundaries of each object in the original image. For example, a segmentation map is able to be a binary image where the object is white and everything else is black. Each of the objects in the original image are also identified as being in the foreground or in the background. In the step 200, a DG map is calculated for the image or frame. In the step 202, in some embodiments, the segmentation map is refined by marking disconnected regions of same objects as separate objects, merging objects with areas smaller than a specified number of pixels with the closest object and generating a secondary binary DG map using the DG map and morphological dilation. The DG map is continuous and rigid, and the binary map is crossed with the segmentation map. If the DG map includes a large object in the segmentation map, that object is broken up into two objects with boundaries at the areas that the DG crosses. In the step 204, in some embodiments, the segmentation map is reordered from objects with the largest area to objects with the smallest area. In the step 206, using morphological operations, a boundary for each object is calculated. In the step 208, using morphological dilation, the boundary is thickened to a certain degree. The degree is dependent on the size and shape of the dilation element. In the step 210, several parameters are calculated for each object. In some embodiments, the parameters calculated include the perimeter of each object, the Average Focus Factor (AFF) which is the mean value of DG values which cross the thickened border and the Uniformity Focus Factor (UFF) which is the ratio of the AFF to the maximum DG value that crosses the border of each object. In the step 212, the objects are ranked based on their AFF in descending order. Objects with a high AFF and a high UFF are the objects located in the depth of field of the image or frame and are highly focused. Objects with a low AFF and a low UFF are either objects that are extended outside of the field of depth or are objects that are not focused on well. In some embodiments, output after the rankings includes the ranked objects based on their focus.

Figure 3:
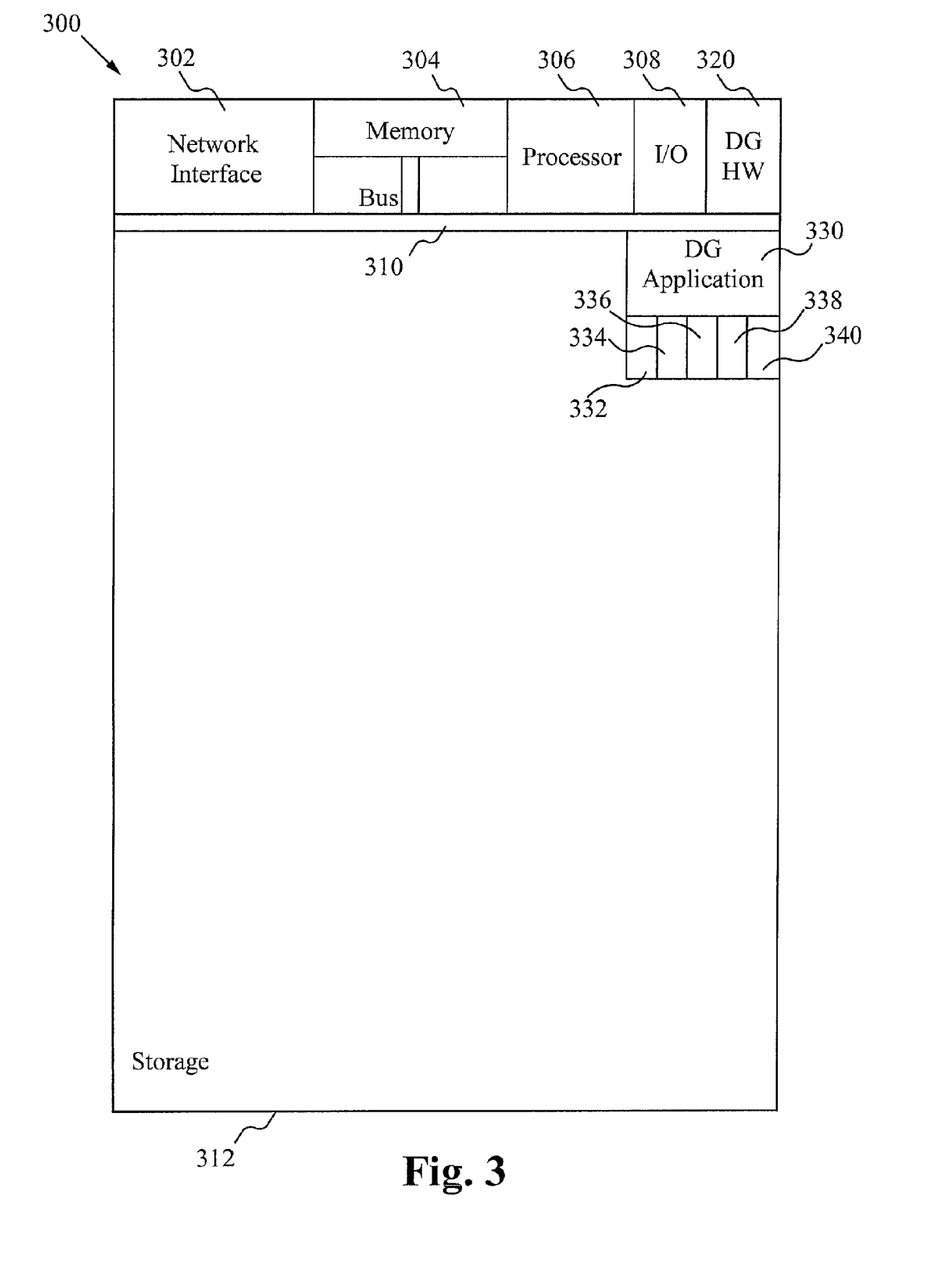
FIG. 3 illustrates a block diagram of an exemplary computing device.

FIG. 3 illustrates a block diagram of an exemplary computing device 300 configured to implement the DG method for finding focused objects. The computing device 300 is able to be used to acquire, store, compute, communicate and/or display information such as images and videos. For example, a computing device 300 acquires a video, and then the DG method for finding focused objects is able to classify the image/frames, find areas of focus in the image/frames, focus a lens of the device and/or enhance the image/frames, in addition to other uses. In general, a hardware structure suitable for implementing the computing device 300 includes a network interface 302, a memory 304, a processor 306, I/O device(s) 308, a bus 310 and a storage device 312. The choice of processor is not critical as long as a suitable processor with sufficient speed is chosen. The memory 304 is able to be any conventional computer memory known in the art. The storage device 312 is able to include a hard drive, CDROM, CDRW, DVD, DVDRW, flash memory card or any other storage device. The computing device 300 is able to include one or more network interfaces 302. An example of a network interface includes a network card connected to an Ethernet or other type of LAN. The I/O device(s) 308 are able to include one or more of the following: keyboard, mouse, monitor, display, printer, modem, touchscreen, button interface and other devices. DG application(s) 330 used to perform the DG focusing method are likely to be stored in the storage device 312 and memory 304 and processed as applications are typically processed. More or less components shown in FIG. 3 are able to be included in the computing device 300. In some embodiments, DG focusing hardware 320 is included. Although the computing device 300 in FIG. 3 includes applications 330 and hardware 320 for DG focusing, the DG focusing method is able to be implemented on a computing device in hardware, firmware, software or any combination thereof.

In some embodiments, the DG application(s) 330 include several applications and/or components. In some embodiments, the DG application(s) 330 include a dominant gradient component 332, a segmentation map component 334, a boundary component 336, a parameter component 338 and a ranking component 340. The dominant gradient component 332 is configured for calculating a dominant gradient map. The segmentation map component 334 is configured for refining a segmentation map and reordering the segmentation map. The boundary component 336 calculates a boundary for each object within an image/frame and thickens the object's boundary. The parameter component 338 calculates one or more parameters for each object such as the AFF and UFF. The ranking component 340 ranks the objects according to the parameters.

Examples of suitable computing devices include a personal computer, a laptop computer, a computer workstation, a server, a mainframe computer, a handheld computer, a personal digital assistant, a cellular/mobile telephone, a smart appliance, a gaming console, a digital camera, a digital camcorder, a camera phone, an iPod®, a video player, a DVD writer/player, a television, a home entertainment system or any other suitable computing device.

Figure 4:
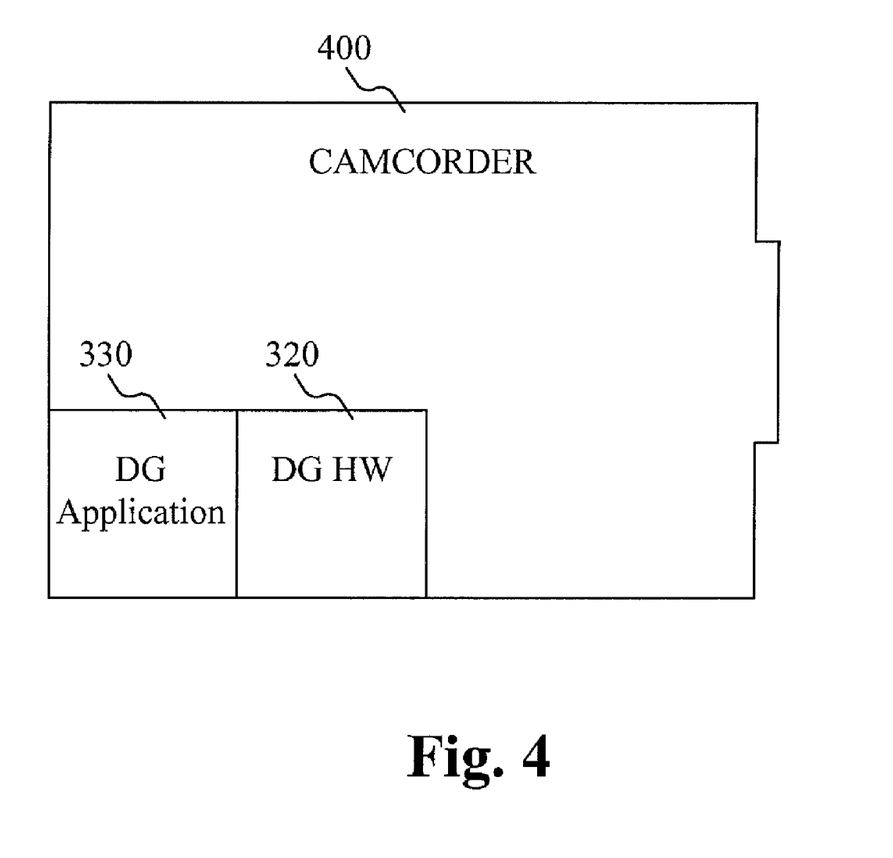
FIG. 4 illustrates a block diagram of a computing device.

FIG. 4 illustrates a block diagram of a computing device 400 such as a camcorder implementing the DG method. Exemplary uses of the camcorder implementing the DG method include acquiring a video such as a video of a wedding celebration with improved focusing from the DG method, and then finding areas of interest with the DG method for video encoding. The camcorder is shown with DG applications 330 and DG hardware 320. As described above, the DG method is able to be implemented in software, firmware, hardware or any combination thereof.

To utilize the DG method for finding focused objects, a computing device operates as usual, but the focusing process, encoding process and/or classification process is improved in that it is more efficient and more accurate by implementing the DG method for finding focused objects. The utilization of the computing device from the user's perspective is similar or the same as one that uses standard encoding. For example, the user still simply turns on a digital camcorder and uses the camcorder to record a video. The DG method is able to automatically improve the focusing, encoding and/or classification process without user intervention. The DG method is able to be used anywhere that requires image capture and/or video encoding. Many applications are able to utilize the DG method for finding focused objects.

In operation, the DG method for finding focused objects enables many improvements related to image/video acquisition, encoding and classification. The consistency of the measure, the ability to separate the foreground from the background edges and to identify the most important part of the image are significant improvements. There are several uses for the dominant gradient method for finding focused objects including, but not limited to, classification of an input image or video for detecting the focused areas and the most important areas of the input, image coding and video coding for finding the areas of interest and/or allocating more bit budget during the encoding of that area, focusing a lens during the capture of an image or video by changing the lens' focus and measuring the level of focus on different areas of a scene and enhancing images and video by measuring their output and providing a feedback mechanism to measure the amount of enhancement in terms of focus-ness of the output image.

The present invention has been described in terms of specific embodiments incorporating details to facilitate the understanding of principles of construction and operation of the invention. Such reference herein to specific embodiments and details thereof is not intended to limit the scope of the claims appended hereto. It will be readily apparent to one skilled in the art that other various modifications may be made in the embodiment chosen for illustration without departing from the spirit and scope of the invention as defined by the claims.

What is claimed is:

1. A method of determining a focused object programmed in a memory of a computing device, the method comprising:
    a. calculating a dominant gradient map to find the focused object;
    b. calculating a boundary for each object within a segmentation map;
    c. thickening the boundary for each object;
    d. calculating one or more parameters for each object;
    e. ranking each object according to a determined focus level based on the one or more parameters; and
    f. refining the segmentation map, wherein refining includes at least one of marking disconnected regions of same objects as separate objects, merging objects with areas smaller than a specified number of pixels with a closest object and generating a secondary binary dominant gradient map using the dominant gradient map and morphological dilation.

2. The method of claim 1 wherein the focused object is contained in one of an image and a video frame.

3. The method of claim 1 wherein calculating a dominant gradient map further comprises:
    a. computing a gradient at each pixel;
    b. defining a window around each pixel;
    c. calculating a slope of the gradient at each pixel; and
    d. selecting a dominant gradient factor at each pixel based on the slope of the gradient having the maximum value.

4. The method of claim 1 further comprising reordering the segmentation map.

5. The method of claim 1 wherein an object at the top of the rankings is the most focused object.

6. The method of claim 1 wherein the one or more parameters includes a least one of a perimeter of each object, an average focus factor and a uniformity focus factor.

7. The method of claim 6 wherein focused objects have a high average focus factor and a high uniformity focus factor.

8. The method of claim 1 wherein the computing device is selected from the group consisting of a personal computer, a laptop computer, a computer workstation, a server, a mainframe computer, a handheld computer, a personal digital assistant, a cellular or mobile telephone, a smart appliance, a gaming console, a digital camera, a digital camcorder, a camera phone, a portable music player, a video player, a DVD writer or player, a television and a home entertainment system.

9. A method of determining a focused object programmed in a memory of a computing device, the method comprising:
    a. calculating a dominant gradient map;
    b. refining a segmentation map, wherein refining includes at least one of marking disconnected regions of same objects as separate objects, merging objects with areas smaller than a specified number of pixels with a closest object and generating a secondary binary dominant gradient map using the dominant gradient map and morphological dilation;
    c. reordering the segmentation map;
    d. calculating a boundary for each object within the segmentation map;
    e. thickening the boundary for each object;
    f. calculating one or more parameters for each object; and
    g. ranking each object according to a determined focus level based on the one or more parameters, wherein objects are ranked in a descending order.

10. The method of claim 9 wherein the focused object is contained in one of an image and a video frame.

11. The method of claim 9 wherein calculating a dominant gradient map further comprises:
    a. computing a gradient at each pixel;
    b. defining a window around each pixel;
    c. calculating a slope of the gradient at each pixel for a number of directions; and
    d. selecting a dominant gradient factor at each pixel based on the slope of the gradient having the maximum value.

12. The method of claim 9 wherein an object at the top of the rankings is the most focused object.

13. The method of claim 9 wherein the one or more parameters includes a least one of a perimeter of each object, an average focus factor and a uniformity focus factor.

14. The method of claim 13 wherein objects with a high average focus factor and a high uniformity focus factor are focused objects.

15. The method of claim 9 wherein the computing device is selected from the group consisting of a personal computer, a laptop computer, a computer workstation, a server, a mainframe computer, a handheld computer, a personal digital assistant, a cellular or mobile, a smart appliance, a gaming console, a digital camera, a digital camcorder, a camera phone, a portable music player, a video player, a DVD writer or player, a television and a home entertainment system.

16. A device for determining a focused object utilizing a computing device, the device comprising:
    a. a memory for storing an application, the application configured for:
        i. calculating a dominant gradient map to find the focused object;
        ii. calculating a boundary for each object within a segmentation map;
        iii. thickening the boundary for each object;
        iv. calculating one or more parameters for each object;
        v. ranking each object according to a determined focus level based on the one or more parameters, wherein objects are ranked in a descending order;

vi. refining the segmentation map, wherein refining includes at least one of marking disconnected regions of same objects as separate objects, merging objects with areas smaller than a specified number of pixels with a closest object and generating a secondary binary dominant gradient map using the dominant gradient map and morphological dilation; and b. a processing component coupled to the memory, the processing component configured for processing the application.

17. The device of claim 16 wherein the focused object is contained in one of an image and a video frame.

18. The device of claim 16 wherein calculating a dominant gradient map further comprises:
   a. computing a gradient at each pixel;
   b. defining a window around each pixel;
   c. calculating a slope of the gradient at each pixel; and
   d. selecting a dominant gradient factor at each pixel based on the slope of the gradient having the maximum value.

19. The device of claim 16 wherein the application is further configured for reordering the segmentation map.

20. The device of claim 16 wherein an object at the top of the rankings is the most focused object.

21. The device of claim 16 wherein the one or more parameters includes a least one of a perimeter of each object, an average focus factor and a uniformity focus factor.

22. The device of claim 21 wherein objects with a high average focus factor and a high uniformity focus factor are focused objects.

23. The device of claim 16 wherein the device captures one of an image and a video.

24. A device comprising a processor and a memory storing an application for determining a focused object implemented by a computing device, the application comprising:
   a. a dominant gradient component configured for calculating a dominant gradient map to find the focused object;
   b. a segmentation map component operatively coupled to the dominant gradient component, the segmentation map component configured for refining a segmentation map and reordering the segmentation map, wherein refining the segmentation map includes at least one of marking disconnected regions of same objects as separate objects, merging objects with areas smaller than a specified number of pixels with a closest object and generating a secondary binary dominant gradient map using the dominant gradient map and morphological dilation;
   c. a boundary component operatively coupled to the segmentation map component, the boundary component configured for calculating a boundary for each object and thickening the boundary for each object;
   d. a parameter component operatively coupled to the boundary component, the parameter component configured for calculating one or more parameters; and
   e. a ranking component operatively coupled to the parameter component, the ranking component for ranking each object according to a determined focus level based on the one or more parameters, wherein objects are ranked in a descending order.

25. The device of claim 24 wherein an object at the top of the rankings is the most focused object.

26. The device of claim 24 wherein the one or more parameters includes a least one of a perimeter of each object, an average focus factor and a uniformity focus factor.

27. The device of claim 26 wherein objects with a high average focus factor and a high uniformity focus factor are focused objects.

28. The device of claim 24 wherein the computing device is selected from the group consisting of a personal computer, a laptop computer, a computer workstation, a server, a mainframe computer, a handheld computer, a personal digital assistant, a cellular or mobile, a smart appliance, a gaming console, a digital camera, a digital camcorder, a camera phone, a portable music player, a video player, a DVD writer or player, a television and a home entertainment system.

29. A network of devices comprising:
   a. a recording device; and
   b. a computing device coupled to the recording device, wherein the computing device and the recording device each contain:
      i. a memory for storing an application, the application configured for:
         (1) calculating a dominant gradient map to find a focused object;
         (2) calculating a boundary for each object within a segmentation map;
         (3) thickening the boundary for each object;
         (4) calculating one or more parameters for each object;
         (5) ranking each object based on the one or more parameters including focus, wherein objects are ranked in a descending order;
         (6) refining the segmentation map, wherein refining includes at least one of marking disconnected regions of same objects as separate objects, merging objects with areas smaller than a specified number of pixels with a closest object and generating a secondary binary dominant gradient map using the dominant gradient map and morphological dilation; and
      ii. a processing component coupled to the memory, the processing component configured for processing the application.

30. The network of devices of claim 29 wherein calculating a dominant gradient map further comprises:
   a. computing a gradient at each pixel;
   b. defining a window around each pixel;
   c. calculating a slope of the gradient at each pixel; and
   d. selecting a dominant gradient factor at each pixel based on the slope of the gradient having the maximum value.

31. The network of devices of claim 29 wherein the application is further configured for reordering the segmentation map.

32. The network of devices of claim 29 wherein an object at the top of the rankings is the most focused object.

33. The network of devices of claim 29 wherein the one or more parameters includes a least one of a perimeter of each object, an average focus factor and a uniformity focus factor.

34. The network of devices of claim 33 wherein objects with a high average focus factor and a high uniformity focus factor are focused objects.

35. The network of devices of claim 29 wherein the recording device captures one of an image and a video.

36. The network of devices of claim 29 wherein the computing device displays one of an image and a video.

* * * * *